US012217612B2

(12) United States Patent
Tanaka et al.

(10) Patent No.: US 12,217,612 B2
(45) Date of Patent: Feb. 4, 2025

(54) MANAGEMENT SYSTEM, MANAGEMENT METHOD AND PROGRAM

(71) Applicant: KDDI CORPORATION, Tokyo (JP)

(72) Inventors: Takaya Tanaka, Tokyo (JP); Hiroshi Kawana, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 123 days.

(21) Appl. No.: 17/953,840

(22) Filed: Sep. 27, 2022

(65) Prior Publication Data

US 2023/0116839 A1 Apr. 13, 2023

(51) Int. Cl.
*G08G 5/00* (2006.01)

(52) U.S. Cl.
CPC ......... *G08G 5/0026* (2013.01); *G08G 5/0013* (2013.01); *G08G 5/003* (2013.01); *G08G 5/0069* (2013.01)

(58) Field of Classification Search
CPC .... G08G 5/0026; G08G 5/0013; G08G 5/003; G08G 5/0069; G08G 5/0052
See application file for complete search history.

(56) References Cited

U.S. PATENT DOCUMENTS

2019/0233102 A1* 8/2019 Kaneichi ............... B64C 39/024
2020/0365039 A1* 11/2020 Yamada ............... G08G 5/0039
2021/0118311 A1* 4/2021 Nakazawa ........... G08G 5/0026
2023/0095120 A1* 3/2023 Choi .................... G08G 5/0082
340/5.61

FOREIGN PATENT DOCUMENTS

JP 2019-010968 A 1/2019
JP 2019-200088 A 11/2019
JP 2021-039450 A 3/2021

OTHER PUBLICATIONS

Machine Translation of JP 2021-039450 retrieved from Google Patents on Jun. 15, 2024 (Year: 2024).*
Japanese Office Action from JP Appl. No. 2021-160740 mailed Nov. 30, 2021 with translation (6 pages).

* cited by examiner

*Primary Examiner* — Thomas Ingram
(74) *Attorney, Agent, or Firm* — Foley & Lardner LLP

(57) ABSTRACT

A management system provided with an acquisition unit that acquires machine identification information for identifying an unmanned moving apparatus, operation data indicating positions of the unmanned moving apparatus corresponding to the machine identification information, and action states of the unmanned moving apparatus; a storage control unit that stores the machine identification information in association with the operation data and the action states acquired by the acquisition unit; and an output control unit that outputs, in display forms corresponding to the action states, a path over which the unmanned movement apparatus moved, based on the operation data.

9 Claims, 9 Drawing Sheets

FIG. 5

| | |
|---|---|
| TIME | 11:36:36 |
| MACHINE ID | AAAAA |
| MOVEMENT SPEED | 20m/s |
| ALTITUDE | 5.5m |
| LATITUDE | 35.5° |
| LONGITUDE | 140.3° |
| MOVEMENT TIME | 5 MINUTES, 30 SECONDS |

FIG. 6

| | |
|---|---|
| TIME | 11:36:36 |
| MACHINE ID | AAAAA |
| AUTONOMOUS MOVEMENT MODE/MANUAL MOVEMENT MODE | AUTONOMOUS MOVEMENT MODE |
| DEVIATION FROM OPERATION ROUTE | LESS THAN PRESCRIBED DISTANCE |
| STATE OF IMAGE CAPTURE APPARATUS | CAPTURING IMAGES |
| OPERATION ROUTE/ADDITIONAL OPERATION ROUTE | OPERATION ROUTE |
| REMAINING BATTERY AMOUNT | 71% |

MANAGEMENT SYSTEM, MANAGEMENT METHOD AND PROGRAM

CROSS REFERENCE TO RELATED APPLICATION

Priority is claimed on Japanese Patent Application No. 2021-160740, filed Sep. 30, 2021, the content of which is incorporated herein by reference.

BACKGROUND OF THE INVENTION

Field of the Invention

The present invention relates to a management system that can communicate with an unmanned moving vehicle that is moving, a management method performed by the management system, and a program for the management system.

Description of Related Art

Unmanned moving apparatuses such as drones sometimes move while switching between a manual mode based on remote operation by an operator and an automatic mode for moving autonomously (for example, see JP 2019-10968 A, hereinafter referred to as Patent Document 1).

SUMMARY OF THE INVENTION

The present invention was made in consideration of the above-mentioned problems, and an objective thereof is to make the state of an unmanned moving apparatus, together with the movement path of the unmanned moving apparatus, easy to understand.

A management system according to a first aspect of the present invention is provided with an acquisition unit that acquires machine identification information for identifying an unmanned moving apparatus, operation data indicating positions of the unmanned moving apparatus corresponding to the machine identification information, and action states of the unmanned moving apparatus: a storage control unit that stores the machine identification information in association with the operation data, and the action states acquired by the acquisition unit; and an output control unit that outputs, in display forms corresponding to the action states, a path over which the unmanned movement apparatus moved, based on the operation data.

The information output apparatus may have a reception unit that receives, from an operation terminal for operating the unmanned moving apparatus, the machine identification information and action instruction data for operating the unmanned moving apparatus corresponding to the machine identification information; and a transmission control unit that transmits the action instruction data received by the reception unit to the unmanned moving apparatus; wherein the action states of the unmanned moving apparatus include states in which the unmanned moving apparatus performs actions based on the action instruction data and states in which the unmanned moving apparatus does not perform actions based on the action instruction data; and the output control unit, based on whether or not the action instruction data has been transmitted by the transmission control unit, outputs the path over which the unmanned moving apparatus moved in different forms between states of performing actions based on the action instruction data in the unmanned moving apparatus and states of not performing actions based on the action instruction data in the unmanned moving apparatus.

The acquisition unit may acquire operation route information including a scheduled operation route over which the unmanned moving apparatus is to move: the storage control unit may store the operation route information; and in a case in which the unmanned moving apparatus moved at a position deviating from the operation route by at least a prescribed distance, the output control unit may output the path over which the unmanned moving apparatus moved in a different form from that in a case in which the unmanned moving apparatus moved at a position that is less than the prescribed distance from the operation route.

The operation route information may include a scheduled arrival time at which the unmanned moving apparatus is to arrive at a prescribed position on the operation route: the operation data may include an arrival time at which the unmanned moving apparatus arrived at the prescribed position on the operation route; and in a case in which a difference between the scheduled arrival time and the time at which the unmanned moving apparatus arrived at the prescribed position on the operation route is equal to or greater than a prescribed time period, the output control unit may output the path over which the unmanned moving apparatus moved in a different form from that in a case in which the difference between the scheduled arrival time and the time at which the unmanned moving apparatus arrived at the prescribed position is less than the prescribed time period.

The acquisition unit may acquire report information indicating that an abnormality has occurred in the unmanned moving apparatus, and a generation time of the report information; the storage control unit may store the report information and the generation time of the report information so as to be associated with the operation data; and the output control unit, based on the generation time of the report information and the operation data, may output the path over which the unmanned moving apparatus moved at a position of the unmanned moving apparatus at which the report information was generated in a different form from that at a position at which the report information was not generated.

The action states of the unmanned moving apparatus may include an action state indicating whether or not the unmanned moving apparatus is capturing images; and the output control unit, in a case in which the unmanned moving apparatus was capturing images during movement, may output the path over which the unmanned moving apparatus moved in a different form from that in a case in which the unmanned moving apparatus was not capturing images. The acquisition unit may acquire additional operation route information, indicating an additional operation route, at a time different from an acquisition time of the operation route; and the output control unit may output a path over which the unmanned moving apparatus moved based on the operation route in a different form from that of a path over which the unmanned moving apparatus moved based on the additional operation route.

The action states of the unmanned moving apparatus may include a state indicating a remaining battery amount of the unmanned moving apparatus; and the output control unit may output a path over which the unmanned moving apparatus moved while the remaining battery amount was equal to or greater than a prescribed value in a different form from that of a path over which the unmanned moving apparatus moved while the remaining battery amount was less than the prescribed value.

An information output method according to a second aspect of the present invention, to be executed by a computer, includes acquiring machine identification information for identifying an unmanned moving apparatus, operation data indicating positions of the unmanned moving apparatus corresponding to the machine identification information, and action states of the unmanned moving apparatus: storing the machine identification information in association with the operation data and the action state that were acquired; and outputting, in display forms corresponding to the action states, a path over which the unmanned movement apparatus moved, based on the operation data.

A non-transitory computer-readable recording medium storing a program according to a third aspect of the present invention makes a computer execute processes, the processes including acquiring machine identification information for identifying an unmanned moving apparatus, operation data indicating positions of the unmanned moving apparatus corresponding to the machine identification information, and action states of the unmanned moving apparatus: storing the machine identification information in association with the operation data and the action state that were acquired; and outputting, in display forms corresponding to the action states, a path over which the unmanned movement apparatus moved, based on the operation data.

BRIEF DESCRIPTION OF THE DRAWINGS

FIG. 5 indicates an example of operation data acquired by an acquisition unit.

FIG. 6 indicates an example of information indicating an action state acquired by the acquisition unit.

DETAILED DESCRIPTION OF THE INVENTION

[Outline of Management System]

Figure 1:
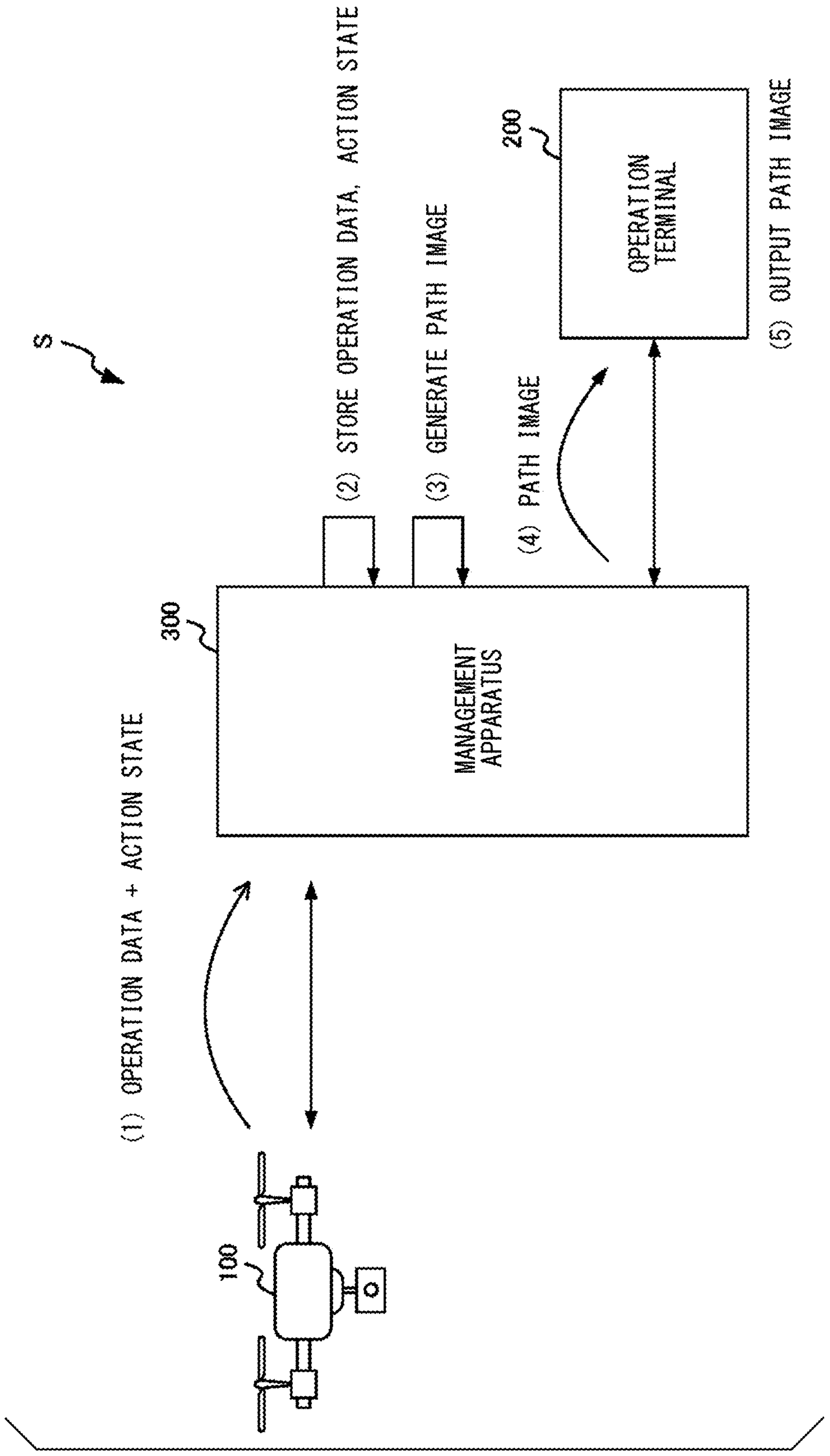
FIG. 1 illustrates an outline of a management system according to an embodiment.

FIG. 1 illustrates an outline of a management system S according to the present embodiment. The management system S is for managing the operation of an unmanned moving apparatus 100.

The management system S is provided with an operation terminal 200 and a management apparatus 300. The management apparatus 300 may internally contain at least some of the functions of the operation terminal 200.

The unmanned moving apparatus 100 is, for example, a flying drone. The unmanned moving apparatus 100 may be a marine or terrestrial drone. The unmanned moving apparatus 100 communicates with the management apparatus 300 via a wireless communication line.

The unmanned moving apparatus 100 moves in either an autonomous movement mode for moving based on a prescribed operation route, or a manual movement mode for moving based on action instruction data from the operation terminal 200.

The unmanned moving apparatus 100 identifies the position of the unmanned moving apparatus 100 during movement by means of a GPS (Global Positioning System) sensor or the like. In the autonomous movement mode, the unmanned moving apparatus 100 moves autonomously based on the identified position and a preset operation route.

The operation terminal 200 is, for example, a tablet. The operation terminal 200 is, for example, a terminal of the owner of the unmanned moving apparatus 100, but may be the terminal of a worker performing maintenance on the unmanned moving apparatus 100. The operation terminal 200 communicates with the management apparatus 300 by wireless communication.

When the unmanned moving apparatus 100 moves in the autonomous movement mode, the operation terminal 200 receives operations by a user inputting a scheduled operation route over which the unmanned moving apparatus 100 is to move. When the unmanned moving apparatus 100 moves in the manual movement mode, the operation terminal 200 receives operations for inputting action instruction data for operating the unmanned moving apparatus 100. The action instruction data, for example, includes information providing instructions for at least one of the orientation of the unmanned moving apparatus 100, the position towards which the unmanned moving apparatus 100 moves, the speed at which the unmanned moving apparatus 100 moves, or an image capture action by an image capture apparatus mounted on the unmanned moving apparatus 100.

The management apparatus 300 is, for example, a server. The management apparatus 300 may be composed of multiple servers. The management apparatus 300 communicates with the unmanned moving apparatus 100 and the operation terminal 200 across a network.

Hereinafter, the flow of the processing in the management system S will be explained. The unmanned moving apparatus 100 transmits, to the management apparatus 300, operation data indicating the position of the unmanned moving apparatus 100 and information indicating the action state of the unmanned moving apparatus 100 ((1) in FIG. 1). The action state is, for example, a state in which the unmanned moving apparatus 100 is autonomously moving without operations on the operation terminal 200, a state in which the unmanned moving apparatus 100 is moving in accordance with operations on the operation terminal 200, or a state in which the position of the unmanned moving apparatus 100 has deviated from the operation route. While the information indicating the action state will be described in detail below, this information is used in order to change the display form of the path over which the unmanned moving apparatus 100 has moved in order to facilitate analysis of the behavior of the unmanned moving apparatus 100 when an abnormality or the like has occurred in the unmanned moving apparatus 100. The management apparatus 300 stores the operation data and the information indicating the action state that have been received in a storage unit ((2) in FIG. 1).

When request information requesting to display the path over which the unmanned moving apparatus 100 has moved has been acquired from the operation terminal 200, the management apparatus 300 generates a path image indicating the path over which the unmanned moving apparatus 100 has moved based on the operation data and the action states stored in the storage unit ((3) in FIG. 1). The path image is represented by lines indicating the movement path based on the operation data, and colors, shapes or patterns indicating the action states.

At this time, the management apparatus 300 generates the path image such that, in the generated path image, the path over which the unmanned moving apparatus 100 has moved in the manual movement mode is indicated in a form that is different from that of the path over which the unmanned moving apparatus 100 moved in the autonomous movement mode. The management apparatus 300 transmits the generated path image to the operation terminal 200 ((4) in FIG. 1). The operation terminal 200 outputs, to the display unit, the path image received from the management apparatus 300 ((5) in FIG. 1).

In this way, the management apparatus 300 can allow a user viewing the path image to easily understand the action states, such as whether the unmanned moving apparatus 100 was moving in the automatic movement mode or in the manual movement mode, corresponding to each position on the path over which the unmanned moving apparatus 10 has moved.

[Structure of Operation Terminal 200]

Figure 2:
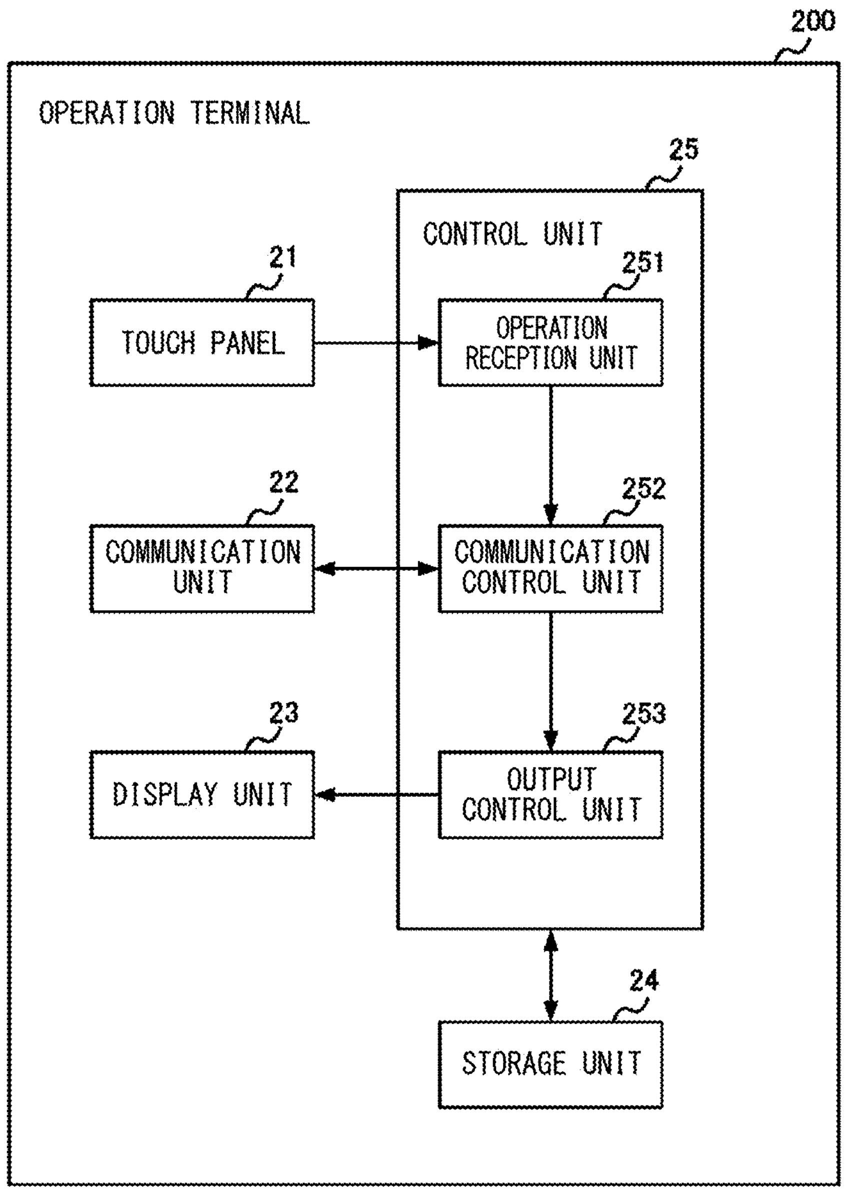
FIG. 2 illustrates a structure of an operation terminal.

FIG. 2 illustrates the structure of the operation terminal 200. The operation terminal 200 is provided with a touch panel 21, a communication unit 22, a display unit 23, a storage unit 24, and a control unit 25. The control unit 25 is provided with an operation reception unit 251, a communication control unit 252, and an output control unit 253.

The touch panel 21 receives, by means of a touch sensor, operations made by a user on a display surface of the display unit 23. The touch panel 21 inputs the received operations to the operation reception unit 251. The communication unit 22 is, for example, a wireless communication module for communicating with the management apparatus 300.

The display unit 23 displays various types of symbols or images. The storage unit 24 is a storage medium including a ROM (Read-Only Memory), a RAM (Random Access Memory), etc. The control unit 25 is, for example, a CPU (Central Processing Unit). The control unit 25 functions as the operation reception unit 251, the communication control unit 252 and the output control unit 253 by executing a program stored in the storage unit 24.

The operation reception unit 251 receives operations by the user via the touch panel 21. For example, in the case in which the unmanned moving apparatus 100 is moving in the manual movement mode, the operation reception unit 251 receives operations for inputting action instruction data for operating the unmanned moving apparatus 100. The operation reception unit 251 outputs the action instruction data that has been received to the communication control unit 252.

Figure 3:
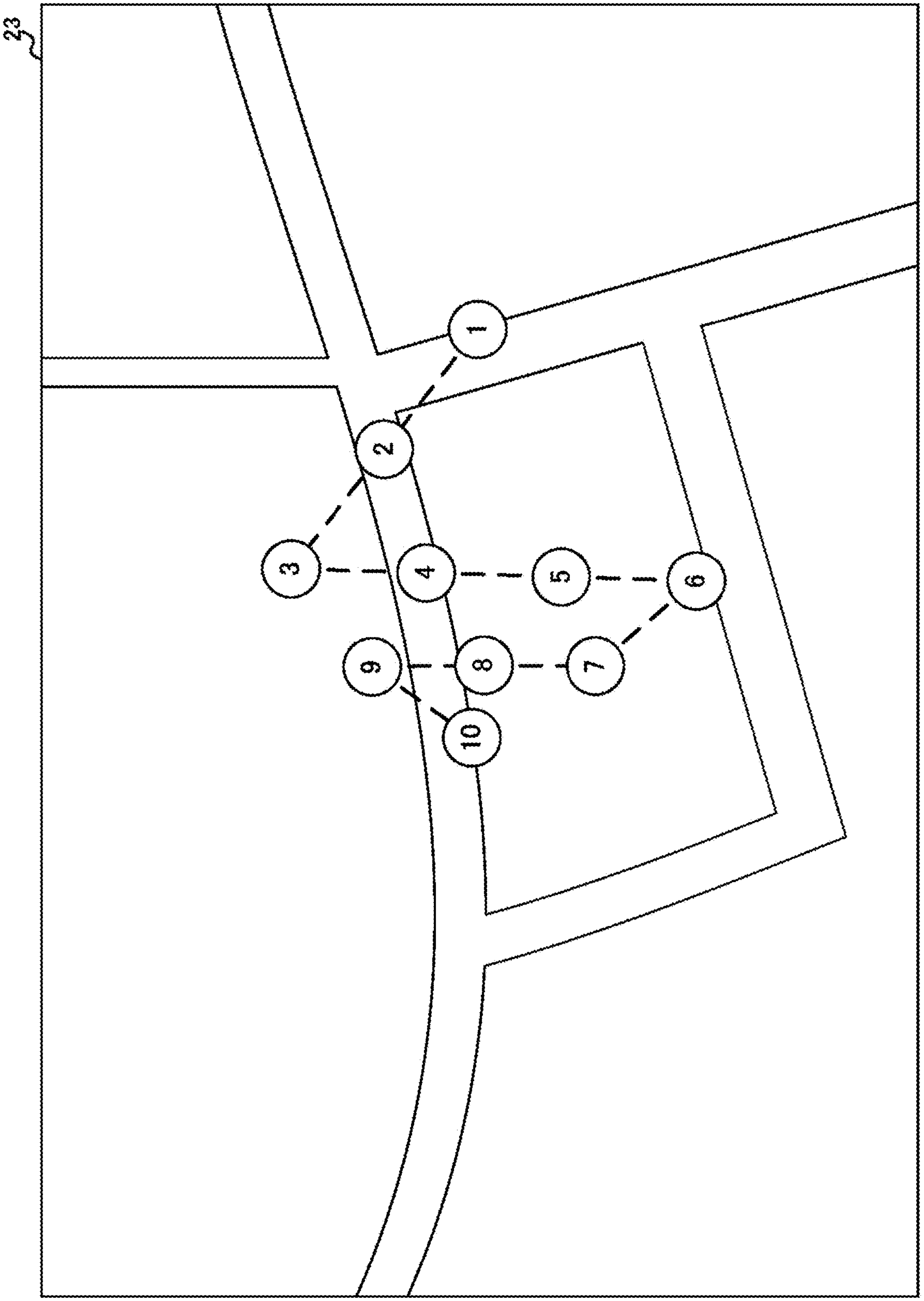
FIG. 3 illustrates an example of an operation route received by an operation reception unit.

In the case in which the unmanned moving apparatus 100 moves in the autonomous movement mode, the operation reception unit 251 receives operations by the user inputting a scheduled operation route over which the unmanned moving apparatus 100 is to move. FIG. 3 illustrates an example of an operation route received by the operation reception unit 251. The circles in FIG. 3 indicate multiple arrival positions at which the unmanned moving apparatus 100 will arrive during movement. The numbers in FIG. 3 indicate the order in which the unmanned moving apparatus 100 arrives at the arrival positions to which the respective numbers are appended.

The dashed lines in FIG. 3 indicate the operation route of the unmanned moving apparatus 100. For example, the operation reception unit 251 receives operations by which the user sets, in order, the arrival positions at which the unmanned moving apparatus 100 is to arrive on the map image displayed on the display unit 23. At this time, multiple arrival positions associated with the set order are registered, thereby determining, as the operation route of the unmanned moving apparatus 100, a route connecting the registered arrival positions in the set order. The operation reception unit 251 may receive, respectively, operations by the user for setting scheduled arrival times at which the unmanned moving apparatus 100 is to arrive at the multiple positions on the operation route. The operation reception unit 251 outputs, to the communication control unit 252, operation route information including the operation route that has been determined and the scheduled arrival times that have been set.

After having received the operation route, or after the unmanned moving apparatus 100 has started to move based on the operation route, the operation reception unit 251 may receive operations by the user for inputting an additional operation route. The additional operation route is an operation route in which a portion of the operation route acquired by the acquisition unit 332 has been changed. The operation reception unit 251 receives operations by the user requesting to display the path image. The operation reception unit 251 outputs, to the communication control unit 252, information indicating the additional operation route that has been received.

The communication control unit 252 communicates with the management apparatus 300 via the communication unit 22. The communication control unit 252 transmits the operation route information indicating the operation route received by the operation reception unit 251 to the management apparatus 300. As mentioned above, the operation route information may include scheduled arrival times received by the operation reception unit 251. Additionally, the communication control unit 252 transmits, to the management apparatus 300, action instruction data received by the operation reception unit 251. For example, the communication control unit 252 transmits, to the management apparatus 300, action instruction data, machine identification information (hereinafter referred to as a machine ID) for the unmanned moving apparatus 100 that is to be operated, and operator identification information (hereinafter referred to as an operator ID) for identifying the user of the operation terminal 200.

The communication control unit 252 receives, from the management apparatus 300, a path image generated by the management apparatus 300. More specifically, in the case in which the operation reception unit 251 has received operations by the user requesting to display a path image, the communication control unit 252 transmits, to the management apparatus 300, request information requesting to display the path image and the machine ID of the unmanned moving apparatus 100. After the request information has been transmitted to the management apparatus 300, the communication control unit 252 receives, from the management apparatus 300, a path image indicating the path over which the unmanned moving apparatus 100 corresponding to the transmitted machine ID has moved.

The output control unit 253 outputs, to the display unit 23, various types of symbols, images, or the like. For example, the output control unit 253 outputs, to the display unit 23, a path image received by the communication control unit 252.

[Structure of Management Apparatus 300]

Figure 4:
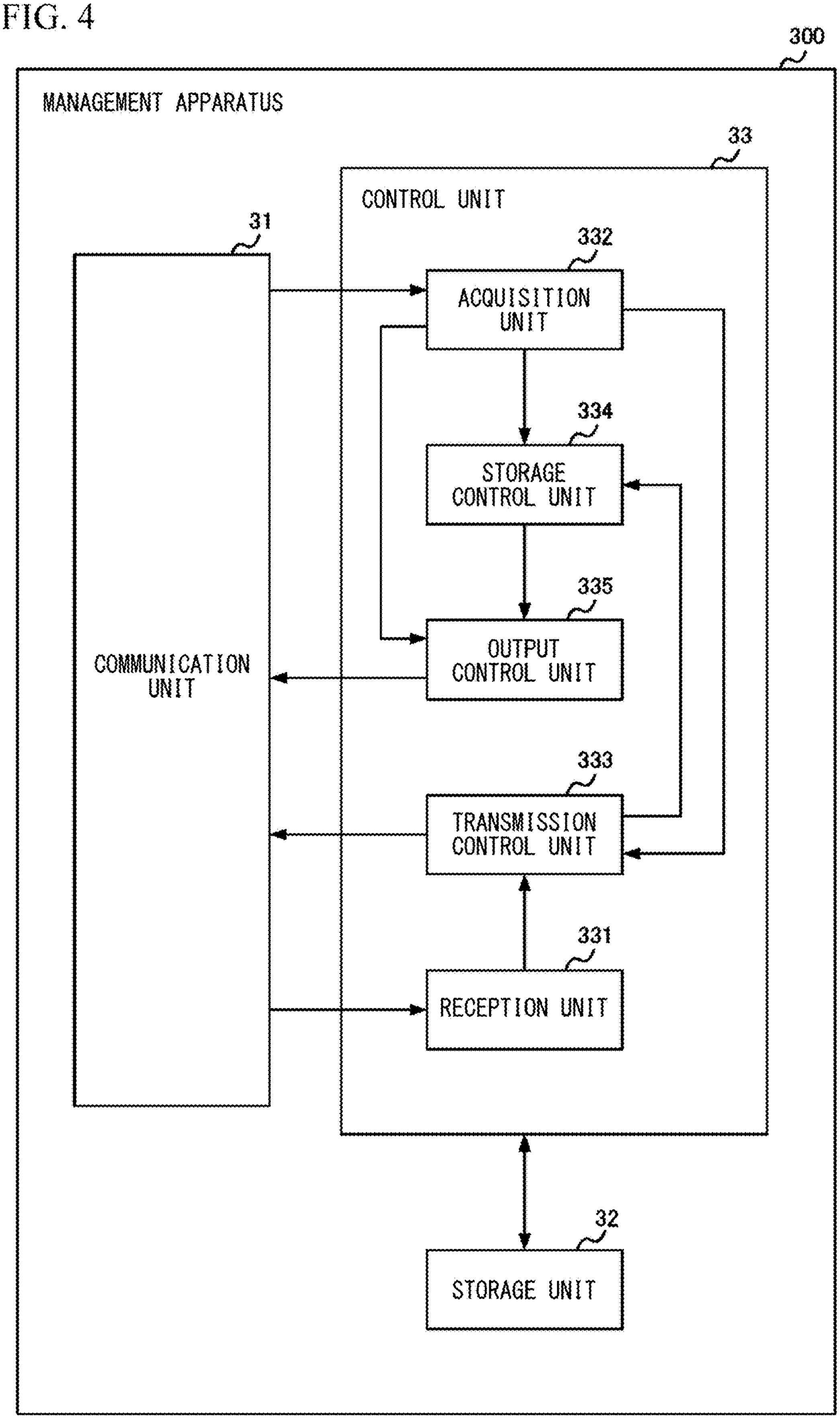
FIG. 4 illustrates a structure of a management apparatus.

FIG. 4 illustrates the structure of the management apparatus 300. The management apparatus 300 is provided with a communication unit 31, a storage unit 32, and a control unit 33. The control unit 33 is provided with a reception unit 331, an acquisition unit 332, a transmission control unit 333, a storage control unit 334, and an output control unit 335.

The communication unit 31 is an interface for communicating with the unmanned moving apparatus 100 and the operation terminal 200 across a network. The storage unit 32 is a storage medium including a ROM, a RAM, etc. The storage unit 32 stores a program executed by the control unit 33. The control unit 33 is, for example, a CPU. The control unit 33 functions as the reception unit 331, the acquisition unit 332, the transmission control unit 333, the storage control unit 334, and the output control unit 335 by executing the program stored in the storage unit 32.

The reception unit 331 communicates with the operation terminal 200 via the communication unit 31. In the case in which the unmanned moving apparatus 100 is moving in the manual movement mode, the reception unit 331 receives, from the operation terminal 200 by which this unmanned moving apparatus 100 is being operated, the machine ID and action instruction data for operating the unmanned moving apparatus 100 corresponding to this machine ID. The reception unit 331 outputs the machine ID and the action instruction data that have been received to the transmission control unit 333. The reception unit 331 further receives, from this operation terminal 200, an operator ID identifying the user of the operation terminal 200. The reception unit 331 outputs the operator ID that has been received to the transmission control unit 333. The reception unit 331 may receive either the operator ID or the machine ID and not receive the other. The storage unit 32 stores an ID table in which operator IDs are associated with machine IDs. By referring to this ID table, the reception unit 331 may identify the machine ID corresponding to an operator ID or may identify the operator ID corresponding to a machine ID.

The acquisition unit 332 acquires various types of information from the unmanned moving apparatus 100 and the operation terminal 200 via the communication unit 31. The acquisition unit 332 acquires operation route information including a scheduled operation route on which the unmanned moving apparatus 100 is to move. For example, the acquisition unit 332 acquires the operation route information and a machine ID from the operation terminal 200. The acquisition unit 332 may acquire additional operation route information indicating an additional operation route at a time different from the operation route acquisition time. The acquisition unit 332 acquires the additional operation route information and a machine ID from the operation terminal 200.

The acquisition unit 332 acquires request information for requesting to display the path over which an unmanned moving apparatus 100 has moved and a machine ID from the operation terminal 200. The acquisition unit 332 outputs the request information and the machine ID that have been acquired to the output control unit 335. The acquisition unit 332 acquires, from the unmanned moving apparatus 100, the machine ID for identifying the unmanned moving apparatus 100, operation data indicating the position of the unmanned moving apparatus 100 corresponding to this machine ID, and information indicating the action state of the unmanned moving apparatus 100. For example, the operation data indicates the latitude, the longitude and the altitude from the ground of the unmanned moving apparatus 100. The operation data includes arrival times at which the unmanned moving apparatus 100 arrived at prescribed positions on the operation route. The prescribed positions are, for example, arbitrary positions on the operation route.

FIG. 5 indicates an example of operation data acquired by the acquisition unit 332. The operation data indicated in FIG. 5 includes the movement speed at which the unmanned moving apparatus moves, the altitude above the ground, the latitude, the longitude, and the movement time period since when the movement started.

The operation data indicated in FIG. 5 includes, as the operation data for the unmanned moving apparatus 100 with the machine ID "AAAAA", which is moving at the time 11:36:36, the movement speed "20 m/s", the altitude "5.5 m", the latitude "35.5°", the longitude "140.3°", and the movement time "5 minutes, 30 seconds".

FIG. 6 indicates an example of information indicating an action state acquired by the acquisition unit 332. As indicated in FIG. 6, the information indicating the action state of the unmanned moving apparatus 100 includes, for example, information indicating the mode in which the unmanned moving apparatus 100 is moving, between a manual movement mode in which actions are performed based on action instruction data and an autonomous movement mode in which actions are not performed based on action instruction data. The information indicating the action state may include information indicating whether the distance by which the position of the unmanned moving apparatus 100 has deviated from the operation route is equal to or greater than a prescribed distance, or less than the prescribed distance, and information indicating whether or not an image capture apparatus mounted on the unmanned moving apparatus 100 is capturing images. The information indicating the action state may include information indicating the remaining battery amount of the unmanned moving apparatus 100. The information indicating the action state may include information indicating the movement speed of the unmanned moving apparatus 100. The information indicating whether the distance by which the position of the unmanned moving apparatus 100 deviates from the operation route is equal to or greater than a prescribed distance, or less than the prescribed distance, is generated, for example, by the unmanned moving apparatus 100 by comparing its own position, identified by the unmanned moving apparatus 100, with a position indicated by the operation route.

Additionally, the information indicating the action state of the unmanned moving apparatus 100 may include information indicating whether the unmanned moving apparatus 100 is moving along an operation route or along an additional operation route. The information indicating the action state of the unmanned moving apparatus 100 may include information indicating the strength of wind around the unmanned moving apparatus 100 during movement. The information indicating the action state may include information indicating which prescribed mode is being used to move while the unmanned moving apparatus 100 is moving autonomously. The prescribed mode, for example, corresponds to the purpose for which the unmanned moving apparatus 100 is moving. As one example, in the case in which the unmanned moving apparatus 100 is monitoring a prescribed area, it may include information indicating which mode is being used for movement, such as moving in a movement mode, or moving in a pursuit mode after having detected a suspicious object.

The information indicating the action state in FIG. 6 indicates that the unmanned moving apparatus 100 with the machine ID "AAAAA", moving at the time 11:36:36, is moving in the autonomous movement mode, the distance by which the position of the unmanned moving apparatus 100 deviates from the operation route is less than the prescribed distance, and an image capture apparatus mounted on the unmanned moving apparatus 100 is capturing images. Additionally, the information indicating the action state in FIG. 6 indicates that the unmanned moving apparatus 100 is moving along the operation route and that the remaining battery amount is 71%. The acquisition unit 332 outputs, to the storage control unit 334, the acquired machine ID, operation data for the unmanned moving apparatus 100 corresponding to this machine ID, and information indicating the action state of the unmanned moving apparatus 100.

The acquisition unit 332 acquires, from the unmanned moving apparatus 100, report information indicating whether or not an abnormality has occurred in the unmanned moving apparatus 100, and time information indicating the time at which this abnormality occurred. As one example, the report information is information indicating that a collision sensor mounted on the unmanned moving apparatus 100 has detected a collision between the unmanned moving apparatus 100 and an obstacle. The acquisition unit 332 outputs, to the storage control unit 334, the acquired report information and information indicating the time at which this report information was generated. The acquisition unit 332 acquires, from the unmanned moving apparatus 100, captured images obtained by the unmanned moving apparatus 100 capturing the environs thereof during movement.

Additionally, in the case in which an image capture error has occurred, in which the acquisition unit 332 has not acquired a captured image from an unmanned moving apparatus 100 despite the transmission control unit 333 having transmitted action instruction data including image capture instructions to the unmanned moving apparatus 100, there is a high probability that an abnormality has occurred in the unmanned moving apparatus 100. For this reason, via the storage control unit 334, the acquisition unit 332 may store, in operation history information, image capture error information indicating that this image capture error has occurred and the time at which this image capture error information was generated, in association with operation data corresponding to the same time stored in the storage unit 32.

The transmission control unit 333 communicates with the unmanned moving apparatus 100 via the communication unit 31. The transmission control unit 333 transmits, to the unmanned moving apparatus 100, action instruction data received by the reception unit 331. The transmission control unit 333 identifies the unmanned moving apparatus 100 corresponding to the machine ID received by the reception unit 331 together with the action instruction data, and transmits this action instruction data to the unmanned moving apparatus 100 that has been identified. The transmission control unit 333 transmits operation route information or additional operation route information acquired by the acquisition unit 332 to the unmanned moving apparatus 100 corresponding to the machine ID acquired together with this operation route information, etc.

The storage control unit 334 stores various types of data in the storage unit 32, and reads out data stored in the storage unit 32 and notifies other processing units. The storage control unit 334 stores the operation route information acquired by the acquisition unit 332 in the storage unit 32. Additionally, in the case in which the unmanned moving apparatus 100 is moving in the manual movement mode, the storage control unit 334 stores, in the storage unit 32, operation history information in which action instruction data received by the reception unit 331 is associated with the machine ID of the unmanned moving apparatus 100 being operated. The storage control unit 334 may store operation history information further including an operator ID in the storage unit 32.

Additionally, the storage control unit 334 stores, in the storage unit 32, operation history information in which the machine ID acquired by the acquisition unit 332 is associated with information indicating the time, operation data of the unmanned moving apparatus 100 corresponding to this time, and the action state corresponding to this time. The storage control unit 334 may store, in the operation history information, report information acquired by the acquisition unit 332 and the time at which the report information was generated, in association with the operation data corresponding to the same time, etc., stored in the storage unit 32.

[Output of Path]

The output control unit 335 outputs the path over which an unmanned moving apparatus 100 has moved, based on the operation data stored in the storage unit 32. The output control unit 335 generates a path image indicating the path over which the unmanned moving apparatus 100 has moved. For example, in the case in which the acquisition unit 332 has acquired a machine ID and request information requesting to display a path over which the unmanned moving apparatus 100 has moved, the output control unit 335 identifies operation data stored in operation history information in association with this machine ID. The output control unit 335 generates the path image by referring to the identified operation data and plotting, on a map, the position of the unmanned moving apparatus 100 every prescribed period of time.

Figure 7:
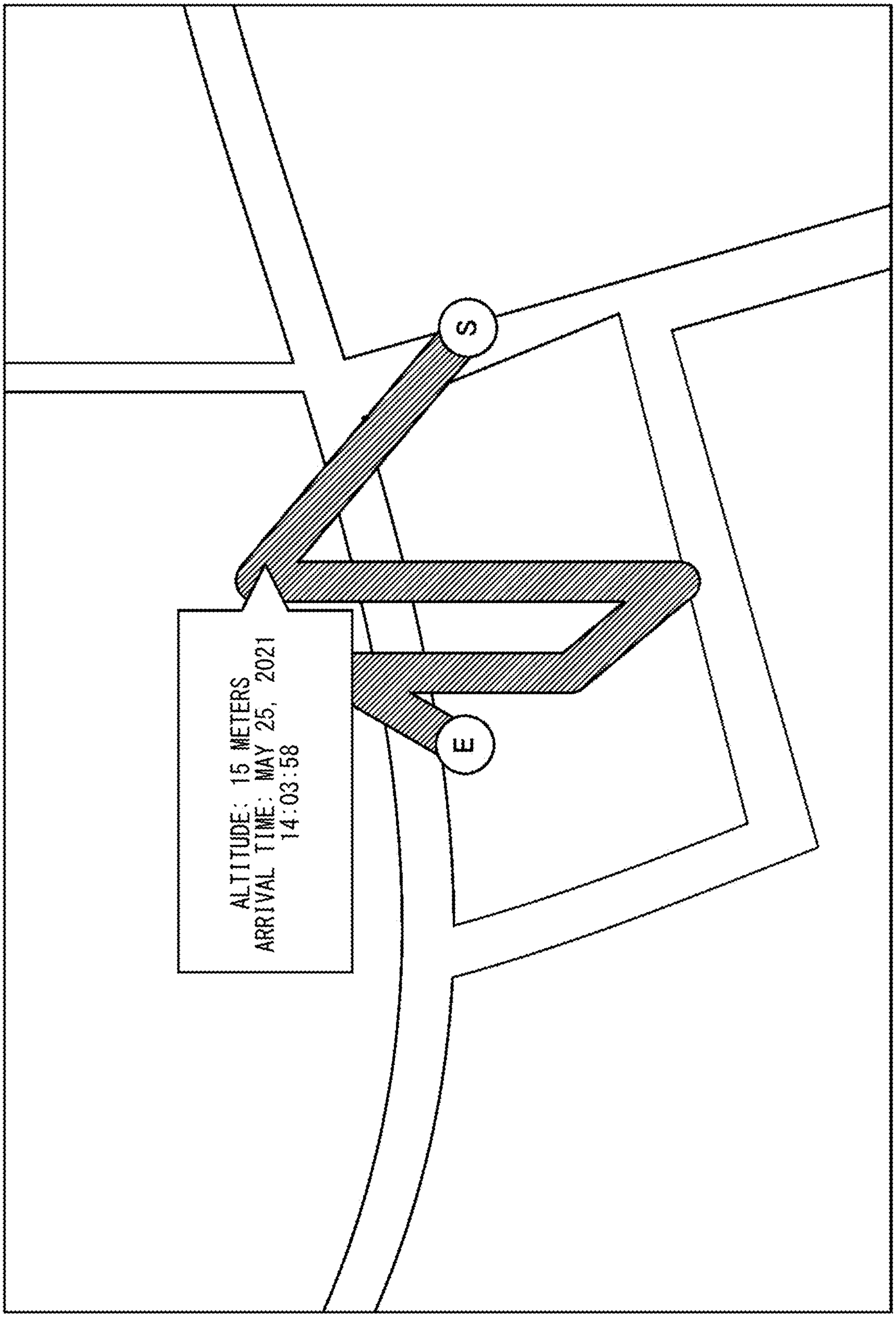
FIG. 7 illustrates an example of a path image generated by an output control unit.

FIG. 7 illustrates an example of a path image generated by the output control unit 335. The thick hatched line in FIG. 7 indicates the path over which the unmanned moving apparatus 100 has moved. The "S" in FIG. 7 indicates the movement starting position of the unmanned moving apparatus 100. The "E" in FIG. 7 indicates the movement ending position of the unmanned moving apparatus 100.

In the case in which the reception unit 331 has received a user's instruction selecting one of the positions on the path, the output control unit 335 superimposes, on the path image, displays of the altitude of the unmanned moving apparatus 100 stored in the operation history information in the storage unit 32 in association with the operation data indicating this position, and of the time at which the unmanned moving apparatus 100 arrived at this position. In the example in FIG. 7, the output control unit 335 superimposes, on the path image, the text "15 meters", indicating the altitude of the unmanned moving apparatus 100, and the text "May 25, 2021/14:03:58", indicating the time at which the unmanned moving apparatus 100 arrived at this position.

The output control unit 335 outputs the path over which the unmanned moving apparatus 100 has moved in a display form corresponding to the action state. For example, based on whether or not the transmission control unit 333 transmitted action instruction data to the unmanned moving apparatus 100, the output control unit 335 outputs the path of movement in the manual movement mode, in which the unmanned moving apparatus 100 performed actions based on the transmitted action instruction data, in a different form from that of the path of movement in the autonomous movement mode, in which the autonomous moving apparatus 100 did not perform actions based on the action instruction data.

More specifically, the output control unit 335 identifies whether the action status stored in the operation history information in association with operation data indicating one of the positions on the path over which the unmanned moving apparatus 100 has moved indicates the manual movement mode or the autonomous movement mode. The output control unit 335 outputs, in a first form, the path at positions corresponding to the action state indicating that the unmanned moving apparatus 100 was in the manual movement mode. The output control unit 335 outputs, in a second form, the path at positions corresponding to the action state indicating that the unmanned moving apparatus 100 was in the autonomous movement mode. The second form involves using colors, texts, or the like that are different from those in the first form.

Figure 8:
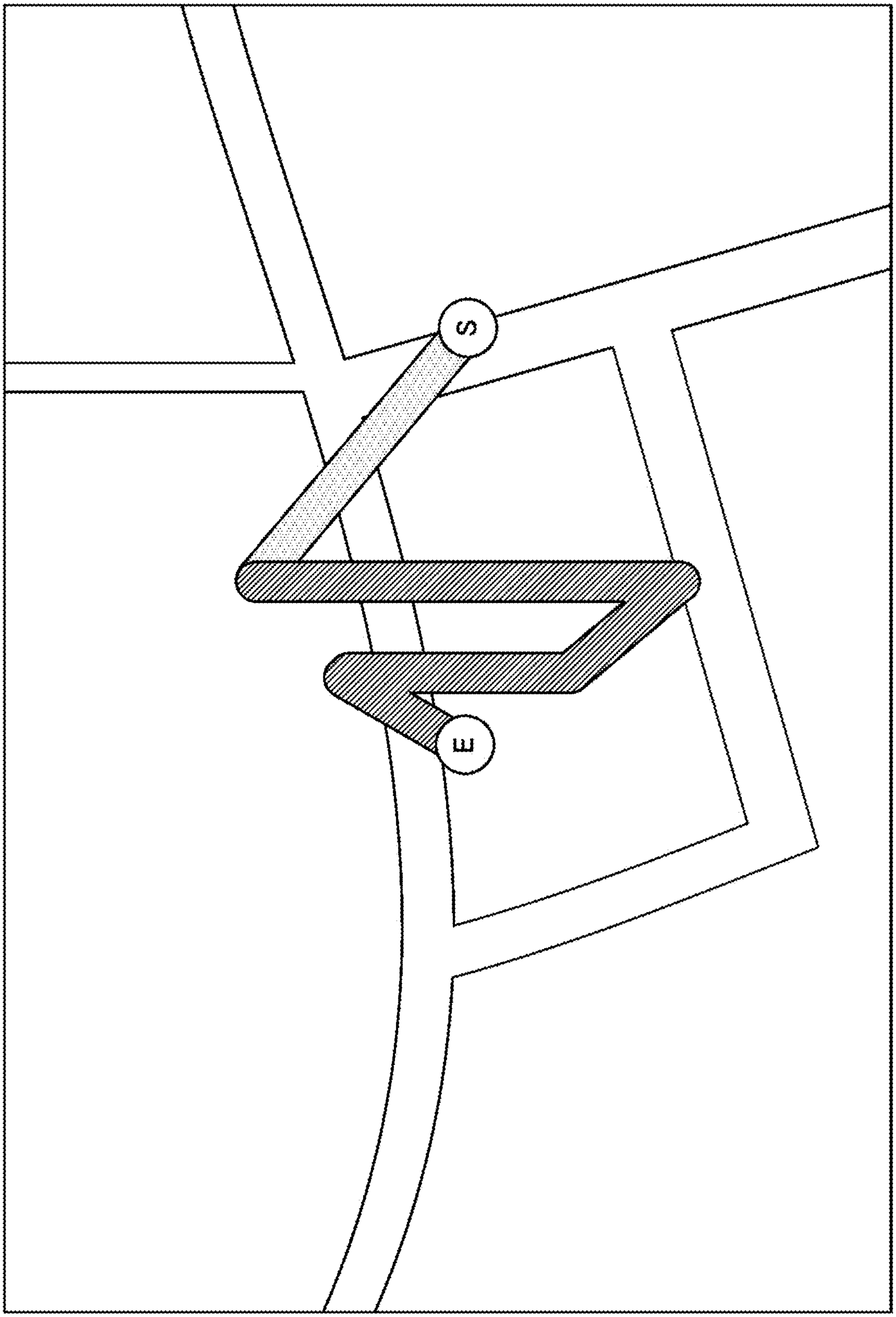
FIG. 8 illustrates another example of a path image generated by the output control unit.

FIG. 8 illustrates an example of a path image output by the output control unit 335 in display forms corresponding to action states. The path image depicted by the halftone dots in the example in FIG. 8 indicates a path during which the unmanned moving apparatus 100 was moving in the manual movement mode. The path image depicted by the hatching in FIG. 8 indicates a path during which the unmanned moving apparatus 100 was moving in the autonomous movement mode. The output control unit 335 outputs the generated path image to the operation terminal 200. Due to the output control unit 335 outputting such a path image, a user viewing this path image can easily understand that, near the movement starting position indicated by "S" in FIG. 8, the unmanned moving apparatus 100 moved in the manual movement mode, and then, due to communication trouble or the like, midway on the path, moved by switching to the autonomous movement mode.

[Output of Path Based on Distance of Deviation from Operation Route]

Additionally, in the case in which the unmanned moving apparatus 100 has moved at a position deviating by at least a prescribed distance from the operation route, the output control unit 335 may output the path over which the unmanned moving apparatus 100 moved in a different form from that in the case in which the unmanned moving apparatus 100 moved at a position less than the prescribed distance from the operation route. The prescribed distance is, for example, the maximum value contemplated as the distance of deviation of the position of the unmanned moving apparatus 100 from the operation route during movement, in the case in which the unmanned moving apparatus 100 is moving normally.

For example, the output control unit 335 determines whether or not information indicating the action state associated with operation data indicating one of the positions on the path over which the unmanned moving apparatus 100 moved indicates that the unmanned moving apparatus 100 was moving at a position deviating by at least the prescribed distance from the operation route.

In the case in which the information indicating an identified action state indicates that the unmanned moving apparatus 100 was moving at a position deviating by at least the prescribed distance from the operation route, the output control unit 335 may output the path at this position in a first form. In the case in which the information indicating an identified action state does not indicate that the unmanned moving apparatus 100 moved at a position deviating by at least the prescribed distance from the operation route, the output control unit 335 may output the path at this position in a second form different from the first form.

There are cases in which an unmanned moving apparatus 100 moves at a position deviating from the operation route due to abnormalities in a rotor of the unmanned moving apparatus 100, due to strong winds, or the like. Since the output control unit 335 displays positions at which the unmanned moving apparatus 100 deviated from the operation route in a different form from that at other positions, the positions at which the unmanned moving apparatus 100 deviated from the operation route can be easily identified by a user.

[Output of Path Based on Difference Between Arrival Time and Scheduled Arrival Time]

Additionally, in the case in which the difference, between the arrival time at which an unmanned moving apparatus 100 arrived at a prescribed position on the operation route and a scheduled arrival time included in operation route information, is equal to or greater than a prescribed time period, the output control unit 335 may output the path over which the unmanned moving apparatus 100 moved in a different form from that in the case in which the difference between the time at which the unmanned moving apparatus 100 arrived at this prescribed position and the scheduled arrival time is less than the prescribed time period. The prescribed time period is, for example, the maximum value contemplated to occur as the difference between the arrival time at which the unmanned moving apparatus 100 arrives at a prescribed position on the operation route during movement and the scheduled arrival time included in the operation route information, in the case in which the unmanned moving apparatus 100 is moving normally.

For example, by referring to the operation data stored in the storage unit 32, the output control unit 335 identifies the difference between a scheduled arrival time for arrival at a prescribed position included in operation route information and the arrival time at which the unmanned moving apparatus 100 arrived at the same prescribed position on the path over which the unmanned moving apparatus 100 is moving. In the case in which the identified difference is equal to or greater than the prescribed time period, the output control unit 335 may output the path at this position in a first form. In the case in which the identified difference is less than the prescribed time period, the output control unit 335 may output the path at this position in a second form.

Additionally, the output control unit 335 may notify a prescribed contact destination in the case in which the identified difference is equal to or greater than the prescribed time period. The prescribed contact destination is, for example, an operation terminal 200 of the user owning the unmanned moving apparatus 100.

[Output of Path of Additional Operation Route]

The output control unit 335 may output a path over which an unmanned moving apparatus 100 moved based on an operation route acquired by the acquisition unit 332 and a path over which the unmanned moving apparatus 100 moved based on an acquired additional operation route in different forms. For example, the output control unit 335 identifies whether information, indicating the action state stored in the operation history information in association with operation data indicating one of the positions on a path over which the unmanned moving apparatus 100 was moving, indicates that the unmanned moving apparatus 100 was moving based on an operation route or indicates that the unmanned moving apparatus 100 was moving based on an additional operation route.

In the case in which the information indicating this action state indicates that the unmanned moving apparatus 100 was moving based on an operation route, the output control unit 335 may output the path at this position in a first form. In the case in which the information indicating this action state indicates that the unmanned moving apparatus 100 was moving based on an additional operation route, the output control unit 335 may output the path at this position in a second form. Thus, the output control unit 335 can allow a user to easily confirm positions at which the unmanned moving apparatus 100 changed the operation route.

[Output of Path Based on Remaining Battery Amount]

The output control unit 335 may output a path over which an unmanned moving apparatus 100 moved while the remaining battery amount was equal to or greater than a prescribed value and a path over which the unmanned moving apparatus 100 moved while the remaining battery amount was less than the prescribed value in different forms. The prescribed value is, for example, a value serving as a reference for cancelling processes such as capturing images that the unmanned moving apparatus 100 has been instructed to perform by action instruction data.

For example, the output control unit 335 respectively identifies the remaining battery amount included in information indicating the action state associated with operation history information at multiple positions on the path over which the unmanned moving apparatus 100 has moved. In cases in which identified remaining battery amounts are respectively indicated to be equal to or greater than the prescribed value, the output control unit 335 may output paths corresponding to these multiple positions in a first form. In the case in which the identified remaining battery amounts are indicated to be less than the prescribed value, the output control unit 335 may output paths corresponding to these multiple positions in a second form.

[Output of Path Based on Report Information]

Based on the operation data and generation times of report information acquired by the acquisition unit 332, the output control unit 335 may output the path over which an unmanned moving apparatus 100 moved such that the positions of the unmanned moving apparatus 100 at which this report information was generated are in a different form from the positions at which report information was not generated. For example, the output control unit 335 determines whether or not report information is included in the operation history information.

In the case in which report information is indicated as not being included in the operation history information, the output control unit 335 may output the path corresponding to the operation data in a first form. On the other hand, in the case in which report information is included in the operation history information, the output control unit 335 may output the path corresponding to the position at which an abnormality indicated by the report information occurred in a second form. The output control unit 335 may also notify a prescribed contact destination in the case in which report information is included in the operation history information. Thus, the output control unit 335 can make it easier for a person to understand the positions at which report information was generated on the path over which the unmanned moving apparatus 100 moved.

[Output of Path while Capturing Images]

In the case in which, in a unmanned moving apparatus 100 during movement, an image capture apparatus mounted on the unmanned moving apparatus 100 is capturing images, the output control unit 335 may output the path over which the unmanned moving apparatus 100 has moved in a different form from that in the case in which the image capture apparatus is not capturing images. For example, the output control unit 335 identifies whether or not the unmanned moving apparatus 100 was capturing images in the information indicating the action state stored in association with the operation data indicating one of the positions on the path over which the unmanned moving apparatus 100 moved.

In the case in which the information indicated by the identified action state indicates that the unmanned moving apparatus 100 was capturing images, the output control unit 335 may output the path at this position in a first form. In the case in which the information indicated by the identified action state indicates that the unmanned moving apparatus 100 was not capturing images, the path at this position may be output in a second form.

The output control unit 335 may output the path over which the unmanned moving apparatus 100 moved, at a position at which an image capture error occurred in the unmanned moving apparatus 100, such that the acquisition unit 332 did not acquire captured images from the unmanned moving apparatus 100 despite the transmission control unit 333 having transmitted action instruction data including instruction to capture images to the unmanned moving apparatus 100, in a different form from that at positions in which an image capture error did not occur. For example, the output control unit 335 determines whether or not image capture error information is included in the operation history information.

In the case in which image capture error information is included in the operation history information, the output control unit 335 may output a path corresponding to the position at which the image capture error occurred in a first form. On the other hand, in the case in which image capture error information is not included in the operation history information, the output control unit 335 may output a path corresponding to these multiple positions in a second form. The output control unit 335 may also notify a prescribed contact destination in the case in which the operation history information includes image capture error information associated with these multiple positions.

[Output of Path Based on Wind Strength or Altitude of Unmanned Moving Apparatus 100]

In the case in which the strength of wind included in information indicating the action state stored in association with operation data indicating one of the positions on a path over which an unmanned movement apparatus 100 moved is less than a reference value, the output control unit 335 may output the path at this position in a first form. The reference value is, for example, the maximum value of the wind strength in which the unmanned moving apparatus 100 can move normally. In the case in which the strength of wind included in information indicating the action state stored in association with operation data indicating a position on the path over which the unmanned movement apparatus 100 moved is equal to or greater than the reference value, the output control unit 335 may output the path at this position in a second form.

In the case in which the altitude stored in operation data associated with one of the positions on a path over which an unmanned movement apparatus 100 moved is equal to or greater than a threshold value, the output control unit 335 may output the path at this position in a first form. The threshold value is, for example, the minimum value of the altitude for the case in which the unmanned moving apparatus 100 is normally moving. In the case in which the altitude stored in the operation data associated with this position is less than the threshold value, the output control unit 335 may output the path at this position in a second form. Thus, the output control unit 335 can output the path over which the unmanned moving apparatus 100 moved in a form corresponding to the altitude of the unmanned moving apparatus 100.

[Output of Path Based on Mode During Movement]

The output control unit 335 may output the path at the position of an unmanned moving apparatus 100 in a different form in accordance with information indicating the mode in which the unmanned moving apparatus 100 is moving, while the unmanned moving apparatus 100 is moving autonomously. For example, the output control unit 335 identifies the mode of movement based on mode information included in information indicating the action state associated, in the operation history information, with multiple positions on the path over which the unmanned moving apparatus 100 is moving, and outputs the path at the positions in a form corresponding to the specified mode.

As one example, in the case in which the unmanned moving apparatus 100 is monitoring a prescribed area, the output control unit 335 outputs the path of the unmanned moving apparatus 100 in a first form if it is identified that the mode of movement is one of moving without pursuing an object. On the other hand, in the case in which the unmanned moving apparatus 100 has been identified as moving in a pursuit mode after having detected a suspicious object, the output control unit 335 outputs the path of the unmanned moving apparatus 100 in a second form. The output control unit 335 may output the path over which the unmanned moving apparatus 100 moves only while performing actions in a specific mode. In this way, the output control unit 335 can allow a user to see only important paths.

[Output of Path Based on Movement Speed of Unmanned Moving Apparatus 100]

The output control unit 335 may output the path in a form corresponding to the movement speed of the unmanned moving apparatus 100. For example, in the case in which the movement speed by which the unmanned moving apparatus 100 is moving, included in the information indicating the action state stored in association with the operation data, is less than a prescribed value, the output control unit 335 outputs the path at these positions in a first form. The prescribed value is, for example, the maximum movement speed that is allowed in an area in which the movement speed of the unmanned moving apparatus 100 is restricted.

Conversely, in the case in which the movement speed included in the information indicating the action state stored in association with the operation data is equal to or greater than a prescribed value, the output control unit 335 outputs the path at these positions in a second form. Thus, the output control unit 335 can make it easier for a user to understand the paths over which the unmanned moving apparatus 100 moved at a movement speed exceeding the prescribed value in areas in which the movement speed of the unmanned moving apparatus 100 is restricted to less than the prescribed value or the like.

[Processing Sequence for Switching Modes]

Figure 9:
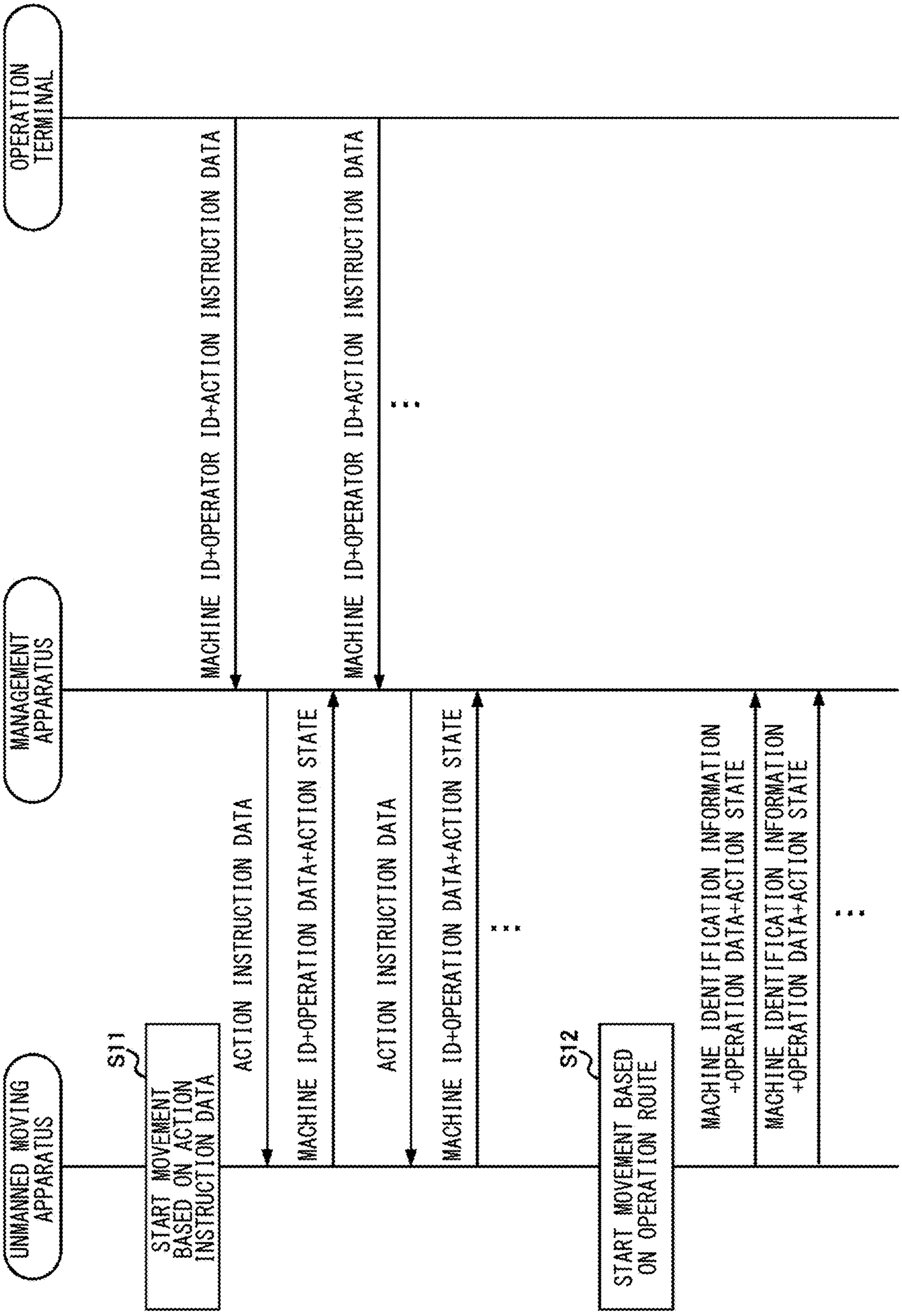
FIG. 9 is a sequence diagram indicating a processing sequence for switching from an autonomous movement mode to a manual movement mode while an unmanned moving apparatus is moving.

FIG. 9 is a sequence diagram indicating a processing sequence for switching from an autonomous movement mode to a manual movement mode while an unmanned moving apparatus 100 is moving. For example, the processing sequence indicated in FIG. 9 is started when the unmanned moving apparatus 100 starts moving.

First, the unmanned moving apparatus 100 starts moving in a manual movement mode for moving based on action instruction data from the operation terminal 200 (S11). The communication control unit 252 in the operation terminal 200 sequentially transmits to the unmanned moving apparatus 100, via the management apparatus 300, the machine ID of the unmanned moving apparatus 100 that is to be operated, the operator ID of the user of the operation terminal 200, and action instruction data for operating the unmanned moving apparatus 100. The transmission control unit 333 transmits the received action instruction data to the unmanned moving apparatus 100 corresponding to the received machine ID. The unmanned moving apparatus 100 moves based on the received action instruction data. The unmanned moving apparatus 100 transmits, to the management apparatus 300, every prescribed time period, a machine ID, operation data, and information indicating the action state. The prescribed time period is, for example, a few seconds.

In the case in which the acquisition unit 332 cannot acquire the action instruction data due to communication trouble or the like, the unmanned moving apparatus 100 starts moving in the autonomous movement mode for moving based on an operation route (S12). The unmanned moving apparatus 100 transmits, to the management apparatus 300, every prescribed time period, the machine ID, operation data, and information indicating the action state.

[Processing Sequence for Outputting Path Over which Unmanned Moving Apparatus 100 has Moved]

Figure 10:
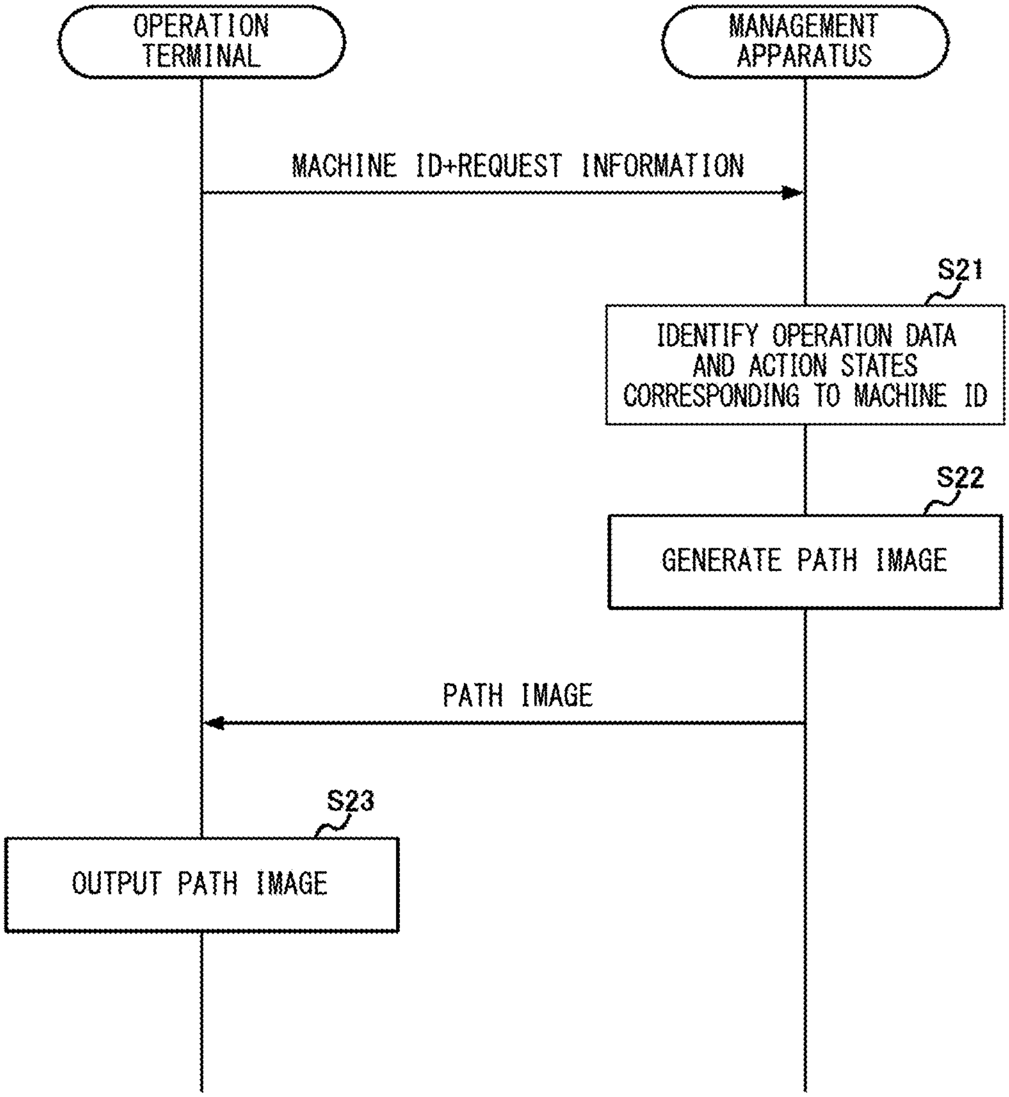
FIG. 10 is a sequence diagram indicating a processing sequence for a management system to output a path over which the moving apparatus has moved.

FIG. 10 is a sequence diagram indicating a processing sequence for the management system S to output a path of movement of the unmanned moving apparatus 100. This processing sequence is started, for example, when the operation reception unit 251 in the operation terminal 200 has received an operation by a user requesting to display a path image.

The communication control unit 252 in the operation terminal 200 transmits the machine ID of the unmanned moving apparatus 100 and request information requesting to display a path image to the management apparatus 300. The output control unit 335 in the management apparatus 300 identifies the operation data and the information indicating the action states stored in the operation history information associated with the received machine ID (S21). The output control unit 335 refers to the identified operation data and generates a path image by plotting the positions of the unmanned moving apparatus 100 on a map for every prescribed time period (S22).

At this time, the output control unit 335 generates the path image so that, in the generated path image, the path at positions corresponding to action states indicating that the unmanned moving apparatus 100 was in the manual movement mode, is indicated in a first form. On the other hand, the output control unit 335 generates the path image so that, in the generated path image, the path at positions corresponding to action states indicating that the unmanned moving apparatus 100 was in the autonomous movement mode, is indicated in a second form.

The output control unit 335 outputs the generated path image to the operation terminal 200. When the path image is received by the communication control unit 252, the output control unit 253 in the operation terminal 200 outputs the received path image to the display unit 23 (S23), and the processing ends.

Effects Due to Present Embodiment

The management apparatus 300 outputs the path over which an unmanned moving apparatus has moved in the manual movement mode of the unmanned moving apparatus 100 in which actions are performed based on action instruction data in a state different from that used for the autonomous movement mode of the unmanned moving apparatus 100 in which actions are not performed based on action instruction data. Therefore, the management apparatus 300 can make it easier for a user who has viewed the path image to understand the action states of the unmanned moving apparatus 100 corresponding to respective positions on the path of the unmanned moving apparatus 100.

Due to the present embodiment, it is possible to contribute to Goal 9, "to build infrastructures for industrialization and to foster innovation" among the sustainable development goals (SDGs) advanced by the United Nations.

As mentioned above, various features are proposed regarding a management system that can communicate with an unmanned moving apparatus that is moving, a management method using said management system, and a program for the management system.

In the case in which the unmanned moving apparatus is moving in a manual mode, instruction data is transmitted from an operation apparatus to the unmanned moving apparatus, for example, via a wireless communication line. In this case, if an abnormality occurs on the communication line during movement, the unmanned moving apparatus continues to move by switching from the manual mode to an automatic mode. However, in a conventional system, after the movement of the unmanned moving apparatus has ended, it is not possible to understand the actions states, such as whether the unmanned moving apparatus was in the manual mode or in the automatic mode, during movement. For this reason, there was a problem in that the reason that the abnormality occurred in the unmanned moving apparatus occurred and the like could not be investigated.

According to at least one exemplary embodiment, the invention has the effect of making the state of the unmanned moving apparatus, together with the movement path, easy to understand, after the unmanned moving apparatus has moved.

While the present invention has been explained by referring to embodiments above, the technical scope thereof is not limited to the scope described among the embodiments above, and various modifications and changes can be made within the scope and spirit thereof. For example, all or part of the apparatus may be configured by being functionally or physically distributed or integrated in arbitrary units. Additionally, new embodiments obtained by arbitrarily combining multiple embodiments are also included among the present embodiments. The effects of the new embodiments created by these combinations are a combination of the effects of the original embodiments.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A management system comprising:

at least one memory configured to store instructions; and at least one processor configured to execute the instructions to:

receive, from an operation terminal for operating an unmanned moving apparatus, machine identification information for identifying the unmanned moving apparatus and action instruction data for operating the unmanned moving apparatus corresponding to the machine identification information;

transmit the received action instruction data to the unmanned moving apparatus to control the unmanned moving apparatus to perform actions based on the transmitted action instruction data;

acquire the machine identification information operation data indicating positions of the unmanned moving apparatus corresponding to the machine identification information, and action states of the unmanned moving apparatus;

store the machine identification information in association with the operation data and the acquired action states; and output, in display forms corresponding to the action states, a path over which the unmanned movement apparatus moved, based on the operation data, wherein the action states of the unmanned moving apparatus include a state in which the unmanned moving apparatus performs actions based on the action instruction data and a state in which the unmanned moving apparatus does not perform actions based on the action instruction data, and in the outputting, based on whether or not the action instruction data has been transmitted, the path over which the unmanned moving apparatus moved is output in different forms between the state of performing actions based on the action instruction data in the unmanned moving apparatus and the state of not performing actions based on the action instruction data in the unmanned moving apparatus.

2. The management system according to claim 1, wherein the at least one processor is further configured to execute the instructions to:

acquire operation route information including a scheduled operation route over which the unmanned moving apparatus is to move; and store the operation route information, and in the outputting, in a case in which the unmanned moving apparatus moved at a position deviating from the operation route by at least a prescribed distance the path over which the unmanned moving apparatus moved is output in a different form from that in a case in which the unmanned moving apparatus moved at a position that is less than the prescribed distance from the operation route.

3. The management system according to claim 2, wherein the operation route information includes a scheduled arrival time at which the unmanned moving apparatus is to arrive at a prescribed position on the operation route;

the operation data includes an arrival time at which the unmanned moving apparatus arrived at the prescribed position on the operation route, and in the outputting, in a case in which a difference between the scheduled arrival time and the time at which the unmanned moving apparatus arrived at the prescribed position on the operation route is equal to or greater than a prescribed time period, the path over which the unmanned moving apparatus moved is output in a different form from that in a case in which the difference between the scheduled arrival time and the time at which the unmanned moving apparatus arrived at the prescribed position is less than the prescribed time period.

4. The management system according to claim 2, wherein the at least one processor is further configured to execute the instructions to:

acquire additional operation route information, indicating an additional operation route, at a time different from an acquisition time of the operation route, and in the outputting, a path over which the unmanned moving apparatus moved based on the operation route is output in a different form from that of a path over which the unmanned moving apparatus moved based on the additional operation route.

5. The management system according to claim 1, wherein the at least one processor is further configured to execute the instructions to:

acquire report information indicating that an abnormality has occurred in the unmanned moving apparatus, and a generation time of the report information; and store the report information and the generation time of the report information so as to be associated with the operation data, and in the outputting, based on the generation time of the report information and the operation data, the path over which the unmanned moving apparatus moved is output in different forms between a position of the unmanned moving apparatus at which the report information was generated and a position at which the report information was not generated.

6. The management system according to claim 1, wherein the action states of the unmanned moving apparatus include an action state indicating whether or not the unmanned moving apparatus is capturing images; and in the outputting, in a case in which the unmanned moving apparatus was capturing images during movement, the path over which the unmanned moving apparatus moved is output in a different form from that in a case in which the unmanned moving apparatus was not capturing images.

7. The management system according to claim 1, wherein the action states of the unmanned moving apparatus include a state indicating a remaining battery amount of the unmanned moving apparatus, and in the outputting, a path over which the unmanned moving apparatus moved while the remaining battery amount was equal to or greater than a prescribed value is output in a different form from that of a path over which the unmanned moving apparatus moved while the remaining battery amount was less than the prescribed value.

8. A management method, to be executed by a computer, the management method comprising:

receiving, from an operation terminal for operating an unmanned moving apparatus, machine identification information for identifying the unmanned moving apparatus and action instruction data for operating the unmanned moving apparatus corresponding to the machine identification information;

transmitting the received action instruction data to the unmanned moving apparatus to control the unmanned moving apparatus to perform actions based on the transmitted action instruction data;

acquiring the machine identification information, operation data indicating positions of the unmanned moving apparatus corresponding to the machine identification information, and action states of the unmanned moving apparatus;

storing the machine identification information in association with the operation data and the acquired action states; and outputting, in display forms corresponding to the action states, a path over which the unmanned movement apparatus moved, based on the operation data, wherein the action states of the unmanned moving apparatus include a state in which the unmanned moving apparatus performs actions based on the action instruction data and a state in which the unmanned moving apparatus does not perform actions based on the action instruction data, and in the outputting, based on whether or not the action instruction data has been transmitted, the path over which the unmanned moving apparatus moved is output in different forms between the state of performing actions based on the action instruction data in the unmanned moving apparatus and the state of not performing actions based on the action instruction data in the unmanned moving apparatus.

9. A non-transitory computer-readable recording medium storing a program that causes a computer of a driving assistance device to perform processes, the processes comprising:

receiving, from an operation terminal for operating an unmanned moving apparatus, machine identification information for identifying the unmanned moving apparatus and action instruction data for operating the unmanned moving apparatus corresponding to the machine identification information;

transmitting the received action instruction data to the unmanned moving apparatus to control the unmanned moving apparatus to perform actions based on the transmitted action instruction data;

acquiring the machine identification information, operation data indicating positions of the unmanned moving apparatus corresponding to the machine identification information, and action states of the unmanned moving apparatus;

storing the machine identification information in association with the operation data and the acquired action states; and outputting, in display forms corresponding to the action states, a path over which the unmanned movement apparatus moved, based on the operation data, wherein the action states of the unmanned moving apparatus include a state in which the unmanned moving apparatus performs actions based on the action instruction data and a state in which the unmanned moving apparatus does not perform actions based on the action instruction data, and in the outputting, based on whether or not the action instruction data has been transmitted, the path over which the unmanned moving apparatus moved is output in different forms between the state of performing actions based on the action instruction data in the unmanned moving apparatus and the state of not performing actions based on the action instruction data in the unmanned moving apparatus.

* * * * *